United States Patent [19]
Wagner et al.

[11] 3,778,901
[45] Dec. 18, 1973

[54] METHOD OF PROTECTING ELECTRICAL CONDUCTOR TERMINATIONS DURING GAS PANEL FABRICATION

[75] Inventors: Peter R. Wagner, Lake Katrine; Donald M. Wilson, Kingston, both of N.Y.

[73] Assignee: International Business Machines Corporation, Armonk, N.Y.

[22] Filed: Dec. 30, 1971

[21] Appl. No.: 214,150

[52] U.S. Cl.................... 29/625, 29/25.13, 29/624, 117/211
[51] Int. Cl. ............................................. H05k 3/28
[58] Field of Search .......................... 313/220, 221; 29/25.1, 25.11, 25.13, 472.5, 472.9, 625, 631, 25.16, 25.19; 316/19, 17; 65/138, 139, 147, 154, 59, 36, 23; 315/169 R, 169 TU, 165; 117/201, 211

[56] References Cited
UNITED STATES PATENTS

| | | | |
|---|---|---|---|
| 3,499,167 | 3/1970 | Baker et al. ................... | 313/220 X |
| 3,604,082 | 9/1971 | McBrayer et al. .............. | 65/59 UX |
| 3,684,909 | 8/1972 | Caras ............................. | 313/221 X |

*Primary Examiner*—Charles W. Lanham
*Assistant Examiner*—Joseph A. Walkowski
*Attorney*—Ralph L. Thomas

[57] ABSTRACT

Thin parallel electrical conductors are protected from attack during elevated temperature operations in gas panel fabrications by a method which involves depositing the parallel electrical conductors on a pair of glass plates with the parallel conductors terminating a given distance from the edges of each glass plate whereby each such plate extends beyond the ends of the parallel conductors, and covering the parallel conductors with a protective glass coating which covers completely the top, sides, and ends of each parallel conductor. Since the ends of the parallel conductors are covered completely, they are protected from attack and destruction during subsequent firing operations in the fabrication of a gas panel. After panel fabrication is completed one end of each glass plate may be cut off flush with the ends of the parallel conductors if desired. The protective glass coating is removed around the end or terminal regions of the parallel conductors whereby the exposed portions of the conductors may serve as electrical contacts.

4 Claims, 3 Drawing Figures

PATENTED DEC 18 1973 3,778,901

METHOD OF PROTECTING ELECTRICAL CONDUCTOR TERMINATIONS DURING GAS PANEL FABRICATION

CROSS-REFERENCES TO RELATED APPLICATIONS

Application Ser. No. 214,348 filed on Dec. 30, 1971 for Gas Panel Fabrication by Peter H. Haberland et al.

Application Ser. No. 214,151 filed on Dec. 30, 1971 for Improved Method of Gas Panel Construction by Thomas J. Murphy et al.

BACKGROUND OF THE INVENTION

1. This invention relates to gas panels and more particularly to a method of constructing gas panels.

2. It is customary in the construction of gas panels to deposit very narrow and very thin parallel lines, which serve as electrical conductors, on a pair of glass plates with the parallel lines on one plate disposed orthoganlly with respect to the parallel lines on the other plate. The plates are spaced apart and sealed around the periphery thereof to form a chamber therebetween for holding an illuminable gas. In the past the parallel lines on each plate extended to the edge of the glass plate, and a protective glass coating disposed over the parallel lines covered the side and top of each parallel line but left the ends of each parallel lines exposed. The exposed ends of the parallel lines were subjected to attack and destruction during subsequent firing operations in the fabrication process. As a result the regions near the ends of parallel lines were pitted or eroded in some case and totally destroyed in other cases. Pitting or erosion resulted from oxidation of the thin parallel lines, and this changed their electrical characteristics. In gas panels the end or terminal regions of the parallel lines are used as electrical contacts which engage companion contacts of an electrical connector. Pitting or erosion resulted in defective electrical connections in some cases, and complete destruction resulted in no electrical connection in other cases. It is to the problem of preserving the end regions of electrical lines, useful also as reliable electrical contacts, by preventing attack and destruction during the fabrication process that this invention is directed.

SUMMARY OF THE INVENTION

It is a feature of this invention to provide an improved method of protecting small, thin electrical lines during the fabrication process of a gas panel.

It is a feature of this invention to provide an improved method of gas panel construction which prevents attack and destruction of small electrical conductors throughout the steps of panel fabrication, especially steps involving elevated temperature firing or baking operations.

In a preferred method of fabricating a gas panel according to this invention two glass plates are used. Electrically conductive parallel lines are disposed on each plate with the electrically conductive parallel lines on one plate extending orthogonally to the electrically conductive parallel lines on the other plate. The parallel lines are deposited on each plate with each plate extending beyond the ends of the parallel lines. Stated alternatively, the end of the parallel lines terminate a given distance from the edges of the glass plates. A protective glass coating is disposed over the parallel lines which completely covers the top, sides, and ends of these lines. A pair of such glass plates are separated a given distance, and a sealing material is disposed between the glass plates around the periphery thereof. The assembly is fired in an oven to seal the glass plates together and thereby form a chamber therebetween. The protective glass coating is removed from the end or terminal regions of the parallel lines thereby to expose such end or terminal regions as electrical contacts. The parallel lines are thus protected from attack and destruction during panel fabrication. If it is desired to have the parallel lines terminate flush with the edges of the glass plates, the glass plates then may be cut back so that the end regions of the parallel lines are flush with the trimmed edges of the glass plates. This may be desirable in some cases where electrical plugs or connectors require companion contacts at or near the edges of the glass plates.

The foregoing and other objects, features and advantages of the invention will be apparent from the following more particular description of a preferred embodiment of the invention, as illustrated in the accompanying drawings.

DESCRIPTION OF THE PREFERRED EMBODIMENTS

Figure 1:
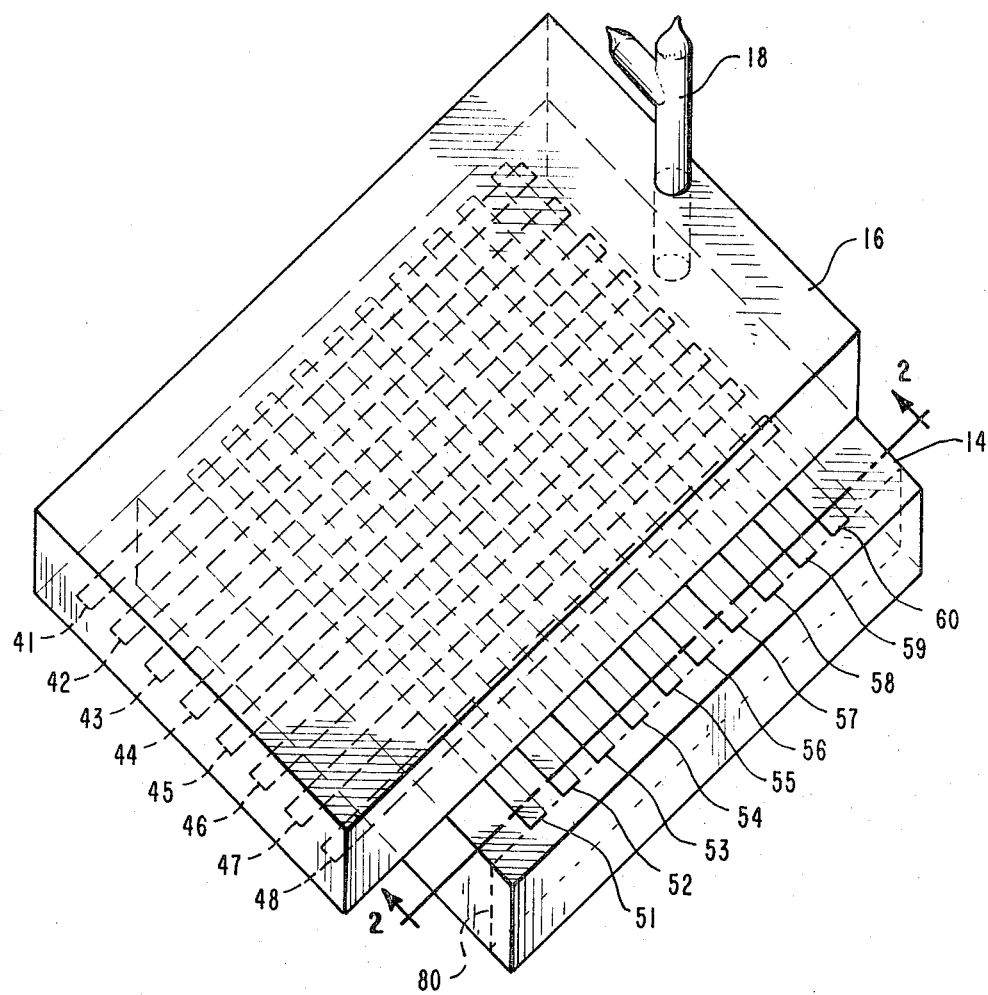
FIG. 1 is a perspective view of a gas panel constructed according to the method of this invention.

A gas panel constructed according to this invention is illustrated in FIG. 1, and it includes a lower plate 14 and an upper plate 16 disposed as shown. These glass plates preferably are one-quarter of an inch thick. The two glass plates are separated a given distance and sealed around their periphery to form a chamber therebetween for holding an illuminable gas. A bifurcated hollow glass tube 18 is used to evacuate the chamber and insert an illuminable gas under less than atmospheric pressure.

The upper glass plate 16 has parallel electrical conductors 41 through 48 disposed on the underside, and the lower glass plate 14 has parallel electrical conductors 51 through 60 disposed on the upper surface. The parallel electrical conductors 41 through 48 on the upper plate 16 are disposed orthogonally to the parallel electrical conductors 51 through 60 on the lower plate 14.

Figure 2:
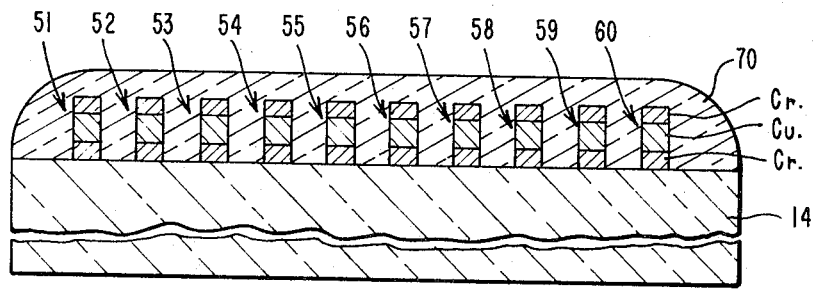
FIG. 2 is a cross-sectional view taken on the line 2—2 of the lower glass plate in FIG. 1.

The electrical conductors 41 through 48 on the upper plate 16 and the electrical conductors 51 through 60 on the lower plate 14 may be deposited thereon by using any one of several well known techniques. One suitable method includes forming a laminate of parallel electrical lines, and this technique is shown and described in copending Application Ser. No. 214,348 filed on Dec. 30, 1971, for Gas Panel Fabrication by Peter H. Haberland et al. This method, briefly summarized, includes the steps of depositing successive coatings by vacumn metalization on each of the plates 14 and 16. A layer of chromium about 1,000A thick is deposited on each glass plate, and a layer of copper about 10,000A thick is deposited on the chromium layer. A second layer of chromium about 1,000A thick is deposited on the copper coating. A layer of photoresist material is disposed on the upper layer of chromium, and the photoresist material is exposed to a light pattern of alternate dark and light parallel regions thereby to define the parallel electrical conductors. After this exposure is made the photoresist coating is developed, and this removes the exposed photoresist material and leaves the photoresist material in the unexposed regions. The plates 14 and 16 are then placed in a solution which etches the laminate between the unexposed regions of the photoresist thereby to yield a plurality of laminated parallel lines. The remaining photoresist material is exposed and removed by developing. Then the upper layer of chromium is oxidized by baking in an oven, and the resulting laminated parallel lines are covered with a glass coating. The resulting structure is illustrated in FIG. 2, which is a cross-sectional view of the lower plate 14 taken on the line 2—2 in FIG. 1. Each of the conductors 51 through 60 is composed of a laminate including chromium, copper, and chromium as illustrated specifically with respect to the conductor 60 in FIG. 2. The glass coating 70 extends over the entire upper surface of the plate 14. A similar glass coating, not shown, covers the entire lower surface of the glass plate 16.

Figure 3:
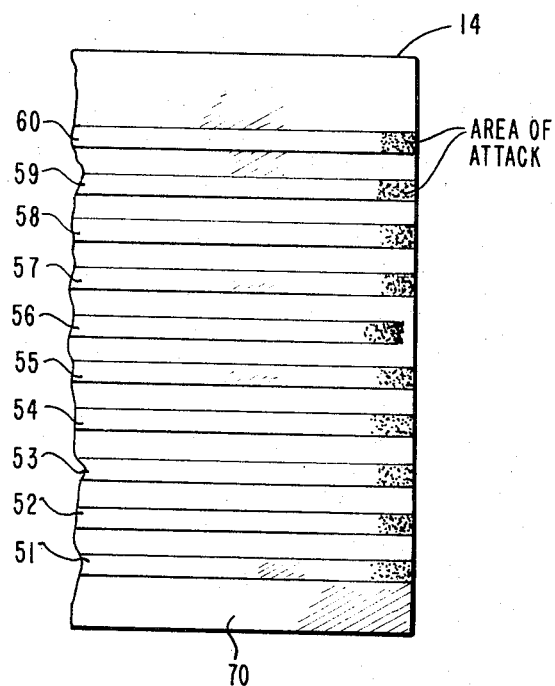
FIG. 3 is a plan view of a portion of a glass plate showing conductors which have been attacked and destroyed.

It was customary in the past to deposit the conductors 51 through 60 of the lower plate 14 and the conductors 41 through 48 of the upper plate 16 by extending them all the way to the end of the respective glass plates. This is illustrated in FIG. 3 which is a plan view of a portion of the lower glass plate 14 with the upper plate 16 removed. The conductors 51 through 60 were deposited as illustrated to extend all the way to the right edge of the glass plate 14. The laminated parallel lines 51 through 60 in FIG. 3 were covered with the glass coating 70 which was applied over all of the upper surface of the glass plate 14, as previously explained. However, the right ends of the laminated parallel lines 51 through 60, flush with the right edge of the plate 14, were left exposed or uncovered by the glass coating 70. During a subsequent step when the glass plate 14 and 16 were fired in an oven to unite them by reflowing a glass frit disposed around their periphery, an undesirable reaction took place. The exposed ends of the copper layer in the laminated parallel lines took part in a reaction which caused them, along with the adjacent layers of chromium, to be attacked and eroded. The area of attack is shown by the dark areas at the right of the parallel lines 51 through 60 in FIG. 3. The end region of the copper in the various parallel lines 51 through 60 was pitted to varying degrees, and in some cases the entire layer of copper in one or more parallel lines was eroded away from the edge of the glass plate 14 as illustrated by the parallel line 56 in FIG. 3.

The regions of the copper layer near the right edge of the glass plate 14 in FIG. 3 are used as electrical contacts, and it is important to assure that the copper layer of each laminated parallel line remains substantially uniform in width and thickness, free of pitting or complete erosion. The condition in FIG. 3 makes electrical connections unreliable and hence reduces the operating capability of the gas panel.

In order to overcome the problem of pitting or erosion at the right ends of the laminated parallel lines 51 through 60 in FIG. 3, the glass plate 14 is extended to the right so that the laminated parallel lines 51 through 60 terminate one-quarter of an inch from the right edge of the plate 14 in FIG. 3. This is shown in FIG. 1 with the laminated parallel lines 51 through 60 terminating a given distance to the left of the right edge of the lower plate 14. Likewise, the left ends of the laminated parallel lines 51 through 60 in FIG. 1 do not extend all the way to the left edge of the lower plate 14. The laminated parallel lines 41 through 48 on the bottom edge of the upper plate 16 do not extend all the way to the left and right edges of this plate. Consequently, the glass coating 70 in FIG. 2 covers completely the ends as well as the sides and top of each one of the laminated parallel lines 51 through 60 in FIG. 1 since it extends over all of the upper surface of the plate 14. A similar glass coating extends over all areas of the lower surface of the plate 16 and covers completely the ends as well as the sides and the outer surface of all of the laminated parallel lines 41 through 48. Therefore, when a subsequent firing operation takes place to seal the plates 14 and 16 together, the end regions of the laminated parallel lines are protected by the glass coating which completely surrounds the end regions of all such parallel lines, and the undesirable reaction and attack on the terminal regions of the laminated conductor is prevented.

After the protective glass coating 70 in FIG. 2 is thus applied to the upper surface of the glass plate 14 and a similar glass coating is applied to the lower surface of the glass plate 16 in FIG. 1, these plates are spaced a given distance apart, and a sealing material is disposed between and around the periphery of the plates 14 and 16. The assembly is fired in an oven to seal the plates 14 and 16 together. The resulting chamber formed between the glass plates 14 and 16 is evacuated through the tubulation 18, and the chamber is filled with an illuminable gas after which the tubulation is tipped off. The method of spacing, sealing, evacuating the chamber, and filling with an illuminable gas may be performed by any one of several different techniques, but a preferred technique is illustrated and described in copending application Ser. No. 214,348 filed on Dec. 30, 1971 for Gas Panel Fabrication by Peter H. Haberland et al.

Next the glass coating 70 in FIG. 2 and the outer layer of chromium are removed in the terminal regions of the parallel lines 51 through 60 in FIG. 1 to expose the end regions of the copper lands as electrical contacts. This removal of the glass coating and the outer layer of chromium may extend from the right ends of the parallel lines 51 through 60 in FIG. 1 to the left any desired distance with the maximum distance being the right edge of the upper glass plate 16. Likewise, the glass coating and the outer chromium layer of each of the laminated parallel lines 41 through 48 is removed from the lower surface of the plate 16 from the left edge any desired distance to the right with the maximum distance being up to the left edge of the lower glass plate 14, thereby to expose the copper lands of the laminated parallel lines 41 through 48 as electrical contacts. The technique for removing the protective glass coating and the outer layer of chromium from the laminated parallel lines may be that illustrated and described in copending application Ser. No. 214,348 filed on Dec. 30, 1971 for Gas Panel Fabrication by Peter H. Haberland.

An electrical plug or connector arrangement, not shown, may be used to engage the exposed copper lands of the laminated parallel lines 41 through 48 and connect them to driving circuits not shown which energize the conductors 41 through 48 to operate the gas panel. A similar electrical plug or connector arrangement, not shown, may be used to engage the exposed copper lands of the parallel lines 51 through 60 and connect them to driver circuits not shown which energize the parallel lines 51 through 60 to operate the gas panel. The electrical connector for the lower plate 14 may be detachably connected to this plate with companion electrical contacts which extend over the top of the glass plate 14 and engage the copper lands of the respective parallel lines 51 through 60. In some instances the electrical plug or contact arrangement requires that the copper lands of the parallel lines 51 through 60 extend all the way to the right edge of the glass plate 14. In such case, the portion of the glass plate 14 to the right of the terminations of the lines 51 through 60 may be severed. The plate 14 may be cut along the dotted line 80. In this case the ends of exposed copper lands of the parallel lines 51 through 60 extend to the right, and they flush with the right edge of the lower plate 14 whereby electrical plugs or connectors which require this construction may be suitably employed. Likewise, the left end of the upper plate 16 may be severed, or not, depending upon the type of electrical plug or connector employed.

It is seen that a unique and novel technique is provided according to this invention for fabricating a gas panel which completely protects the ends of the copper lands of the parallel lines 41 through 48 of the upper plate 16 and the parallel lines 51 through 60 of the lower plate 14 in FIG. 1 during the fabrication of the gas panel, and the exposed copper lands of these parallel conductors may be terminated flush with or a given distance back from the edges of the glass plates as required by an electrical plug or connector. Thus the proper thickness and length of the copper lands as well as the proper electrical conductivity of the electrical lands is assured.

While the invention has been particularly shown and described with reference to a preferred embodiment thereof, it will be understood by those skilled in the art that various changes in form and details may be made therein without departing from the spirit and scope of the invention.

What is claimed is:

1. A method of fabricating a gas panel which includes a pair of transparent plates having parallel lines which serve as electrical conductors placed on each transparent plate with the parallel lines of one transparent plate extending orthogonally to the parallel lines of the other transparent plate, the transparent plates being spaced apart and sealed together to form a chamber therebetween for holding an illuminable gas, the improved method of fabrication comprising the steps of:
   1. disposing the parallel lines on each transparent plate with the ends of the parallel lines terminating a given distance from the edges of each transparent plate so that each such transparent plate extends beyond the ends of the parallel lines,
   2. covering entirely the parallel lines on each transparent plate over the top, sides and ends with a protective coating which protects the parallel lines from corrosion or attack during subsequent heating operations, and
   3. removing the protective coating on each transparent plate after the heating operations from the top of the parallel lines at least at one end thereof back a given distance from such end thereby to expose such top regions of the parallel lines as electrical contacts.

2. The method of claim 1 further including the step of cutting off at least one edge of each transparent plate flush with the ends of the parallel lines having exposed top regions thereby to facilitate the mating of the exposed top regions of the parallel lines as electrical contacts with an electrical connector.

3. A method of fabricating a gas panel which includes a pair of transparent plates having electrical lines which serve as electrical conductors placed parallel to one another on each transparent plate with the electrical lines of one transparent plate extending orthogonally to the electrical lines of the other transparent plate, the transparent plates being spaced apart and sealed together to form a chamber therebetween for holding an illuminable gas, the improved method of fabrication comprising the steps of:
   1. disposing the electrical lines on each transparent plate with the ends of the electrical lines terminating a given distance from the edge of each transparent plate so that each such transparent plate extends beyond the ends of the electrical lines,
   2. covering the electrical lines over the top, sides and ends with a protective coating which protects the electrical lines from corrosion or attack during subsequent heating operations, and
   3. removing the protective coating from the top region of each electrical line at least at one end thereof back a given distance from such end after the heating operations thereby to expose such top regions of the electrical lines as electrical contacts.

4. The method of claim 3 further including the step of cutting off at least one edge of each transparent plate flush with the ends of the electrical lines having exposed top regions thereby to facilitate the mating of the exposed top regions of the parallel lines as electrical contacts with an electrical connector.

* * * * *